Nov. 21, 1944.　　　K. L. WOODMAN　　　2,363,376

THERMOSTAT

Filed June 10, 1942

WITNESSES:
Edward Michaels
H.G. Hepler

INVENTOR
Kenneth L. Woodman.
BY
W. R. Coley
ATTORNEY

Patented Nov. 21, 1944

2,363,376

UNITED STATES PATENT OFFICE 2,363,376

THERMOSTAT

Kenneth L. Woodman, Mansfield, Ohio, assignor to Westinghouse Electric & Manufacturing Company, East Pittsburgh, Pa., a corporation of Pennsylvania Application June 10, 1942, Serial No. 446,434

7 Claims. (Cl. 200—138)

My invention relates to thermostats and, more particularly, to snap-acting strip type bimetallic thermostats which operate within two separate temperature ranges.

It is extremely advisable to protect (as well as to provide thermostatic control for) percolators, teakettles, water heaters and other devices, by a suitable means which prevents the heating elements thereof from becoming overheated. Heretofore, it has been the custom to use, for example, a fusible member, in addition to a variable thermostatic structure which regulates the temperature, for protecting the device. Further, structures of this type have been built utilizing two thermostatic devices, one of which is used as a thermal protective device, while the other device has been used to regulate the normal operating temperatures thereof.

In substantially all of these cases, it has been found that there is a definite thermal lag between the heating element and the safety thermal protective device. This lag permits the heating element to operate within an extremely wide temperature cycle, which is detrimental to the life of the element and at times, such lag has been responsible for failure in protecting the structure from burning out.

To overcome such disadvantages and to provide adequate and positive protection for the heating element and the device being heated, I have provided a single thermostatic structure which performs the dual function of maintaining the heating element at a set value and at the same time of protecting said device from overheating.

It is, therefore, an object of my invention to provide a thermostatic structure having a bimetallic element embodying two portions which have different thermal operating characteristics.

A further object of my invention is to provide within a single structure a thermostat embodying an elongated snap-acting strip bimetal having at least two portions, one of which flexes independently of the other portion.

A further object of my invention is to provide a thermostatic structure having a bimetallic element which has two different cross-sectional widths in two portions thereof, one of which when moving with a snap action bodily moves the second portion regardless of the position of said second portion so as to operate the cooperating contacts independently of said second portion.

Still a further object of my invention is to provide a thermostatic structure having a snap-acting bimetallic element which has two portions, one of which operates at a normal temperature, the second of which operates at a substantially higher temperature to open suitable cooperating contacts and which may be reclosed by any suitable manually operable reset device.

Other objects of my invention will either be pointed out specifically in the course of the following description of a device embodying my invention or will be apparent from such description, reference being had to the accompanying drawing, in which.

Figure 1:
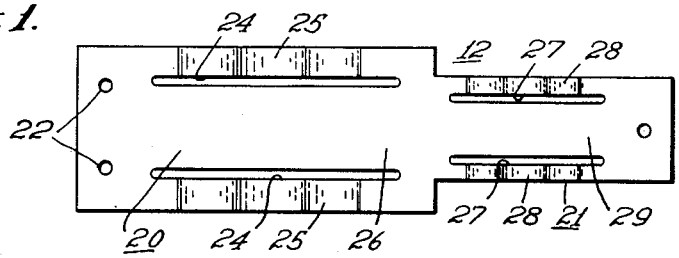
Fig. 1 is a top view of a snap-acting bimetallic element embodying my invention.

Referring to the accompanying drawing, in which like reference characters indicate like parts in the several figures, there is shown as thermostatic structure 10 embodying a supporting structure 11, a strip type bimetallic element 12, cooperating movable contacts 13, and stationary contacts 14 terminal posts 15 associated therewith, and a manual reset means 16 in line with the bimetallic element 12 for bodily moving said element when said element is in one of its inoperative positions.

The supporting structure 11 comprises, in this instance, an elongated flat plate-like member which has a suitable depending post 17 rigidly attached at one end thereof and the terminals 15 and stationary contacts 14 insulatedly attached to the other end thereof. Said plate or base 11 is, in this instance, made of a suitable metallic sheet and has a depending inwardly extending portion 18 integral therewith. However, it is to be understood that said base 11 may be made of any other desired material and in any other suitable configuration. The terminal posts 15 and the stationary contacts 14 are insulated from the base by means of suitable insulating washer-like members 19, in keeping with established practice and are positioned above the portion 18.

Figure 2:
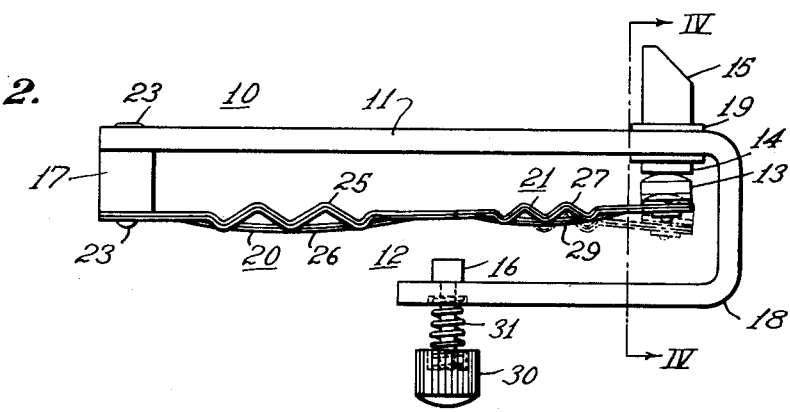
Figs. 2 and 3 are side elevational views of a thermostat having the element shown in Fig. 1 incorporated therewith in a contact closed and open position, respectively.
Figure 4:
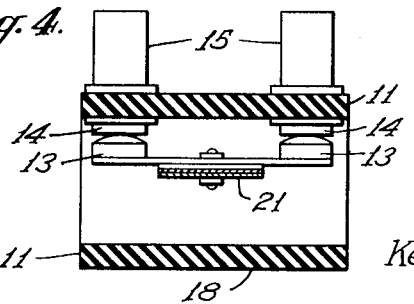
Fig. 4 is a sectional view taken along the line IV—IV of Fig. 2.

The bimetallic element 12 is formed of suitable strip material, and has a portion 20 of wide cross section at one end thereof and portion 21 of a relatively narrower cross-section at the other end. The larger portion has suitable apertures 22 located in the free end thereof to receive suitable rivets 23 which pass through post 17 so as to rigidly attach said element 12 to the supporting structure 11. The movable contacts 13 are insulatedly attached, in this instance, to the free end of the smaller portion 21 of the bimetallic element 12 so as to engage the stationary contacts 14 when the bimetallic element 12 is in its closed or engaged position (see Figs. 2 and 4).

Each portion 20 and 21 of the bimetallic element 12 is preferably made snap-acting in line with the teachings of P. R. Lee Patent No. 2,259,312, assigned to the assignee of this application. Specifically, the larger portion 20 has two longitudinally extending slots 24 therein forming two outer legs 25 and a central leg 26. The outer legs 25 each have a series of crimps formed in the central portion thereof to effectively reduce the length of said outer legs, causing said legs to be under tension and to apply a compressive action to the center leg 26. Accordingly, in keeping with the teachings of the above-mentioned patent, the free end of said portion 20 will move from one position to another with a snap action in response to changes in temperature thereof. Likewise, the smaller or narrower portion 21 has two longitudinally extending slots 27 therein which form two exterior legs 28 and a central leg 29. In a similar manner, the central portions of the two exterior legs 28 are crimped so as to apply a tension to said strips and simultaneously apply a compressive action to the central leg 29. The free end of said smaller or narrower portion 21 will then likewise move from one position to another with a snap action in keeping with the teachings of the above-identified patent.

Figure 3:
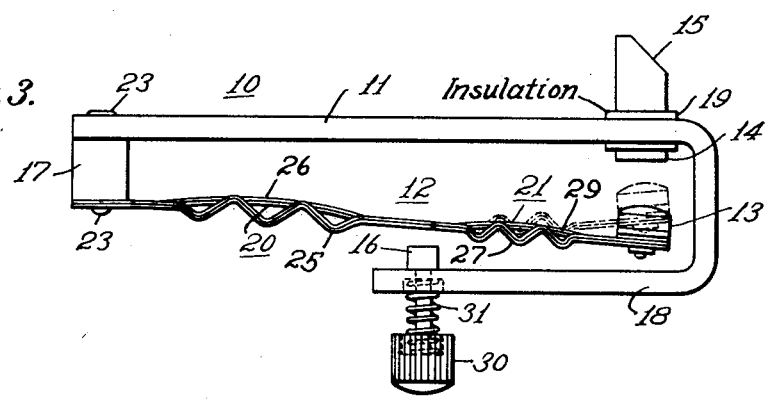

It is to be understood that each portion 20 and 21 of the bimetallic element 12, due to the formation of the slots and the general deformation of the exterior legs, will move or function as independent bimetallic snap acting members. Specifically, the narrower portion 21 will function independently of the movements of the larger portion 20 and operate as an independent snap-acting bimetallic element which is rigidly attached to a supporting structure by means of one end thereof. The larger portion 20 will likewise function as a separate snap-acting bimetallic element. However, due to the fact that both portions 20 and 21 are functionally integral, the narrower portion 21 will be bodily moved in response to the movements of the larger portion 20. In other words, as the larger portion 20 moves to an open position, it will carry the smaller portion 21 with it and disengage the cooperating contacts 13 and 14, regardless of the then present or the subsequent position of said smaller portion 21 (see Fig. 3).

The thermal characteristics of the larger portion 20 of the bimetallic element 11 are such that it will move the bimetallic element 12 to a contact open position at a temperature substantially above that of the operation of the narrower portion 21. In addition, the contact-reclosing temperature of said larger portion 20 is normally below the room temperature. Accordingly, it follows that the manual reset means 16 must be used to reengage the cooperating contacts 13—14 after the larger portion 20 has snapped to its open position.

The manual reset means 16 passes through the depending inwardly extending portion 18 of the supporting structure 11 substantially in line with the movable end of the larger portion 20 of the bimetallic element 12. The manual reset means 16 is, in this instance, a two diameter elongated button-like member 30 and has positioned thereabout a suitable resilient member 31 for biasing said button-like member 30 to its outermost position. Said button-like member may be depressed or moved into engagement with the bimetallic element 12 by an operator who desires to bodily move the bimetallic element 12 from its lower or contact open position (see Fig. 3) to its upper or closed position (see Fig. 2). It is to be understood, however, that, in this instance, the reset means 16 is used to re-engage the cooperating contacts 13—14 only when the larger portion 20 of the bimetallic element 12 has snapped to its open position.

When utilizing a thermostat embodying my invention, it follows that with the cooperating contacts 13—14 in a closed position, current will flow therethrough and, therefore, increase the temperature of the device (not shown) which is being controlled. As the temperature of said device increases to a predetermined value, the narrower portion 21 of the bimetallic element 12 will flex to its open position, see dotted lines Fig. 2, deenergizing said device. After the device has cooled to a predetermined value said portion 21 will return to its contact-engaged position. Accordingly, under normal conditions, the narrower portion 21 will maintain the device at a predetermined temperature in keeping with established practice.

However, if for any reason whatsoever, the temperature of the device increases to a value substantially above that which is desired, the larger portion 20 of the bimetallic element 12 will flex downwardly bodily moving the narrower portion 21 and disengaging the cooperating contacts 13—14 regardless of the position of said narrower portion. It being understood, however, that said narrower portion 21 under normal conditions would have previously moved to a contact open position. The controlled device will then be deenergized and as it cools to the normal contact closing position, said narrower portion 21 will move towards its contact closed position (see dotted lines Fig. 3). However, inasmuch as said narrower portion 21 has been bodily moved away from the stationary contacts 14, by means of the larger portion 20, the movable contacts 13 will not engage the stationary contacts 14. Accordingly, the device will remain deenergized until an operator resets the thermostat 10, by means of button 30.

The thermostat 10 is reset or made operable by the operator depressing the manual reset button 30, said button when being depressed engaging the movable end of the larger portion 20 of bimetallic element 12 so as to flex said element to its contact closed position whereupon said element 12 will function in a normal manner.

It is, therefore, obvious that by utilizing the plural-sectioned bimetallic element as hereinbefore described, applicant has provided a single structure which will function as a thermostat in maintaining a desired temperature within a suitable device such as a coffee maker, teakettle, percolator, water heater, etc., while at the same time providing suitable temperature or thermal protection for preventing the bimetallic element and device from being injured.

Various modifications may be made in the illustrated device embodying my invention without departing from the spirit and scope thereof, and I desire, therefore, that only such limitations shall be placed thereon as are imposed by the prior art and the appended claims.

I claim as my invention:

1. A thermostat comprising, in combination, a supporting structure and a bimetallic element having two portions of different widths to operate at different temperatures, both portions moving in the same direction upon an increase in temperature, the first portion being normally operative in a predetermined temperature range for effecting a control action and the second portion snapping only upon the occurrence of abnormal temperatures to bodily move the first portion to a position in which its movements are ineffective to provide the control action, said element being attached to the supporting structure by means of one the second portion only.

2. A thermostat comprising, in combination, a supporting structure and a bimetallic element having two portions of different widths to operate at different temperatures, both portions moving in the same direction upon an increase in temperature, the first portion being normally operative in a predetermined temperature range for effecting a control action and the second portion snapping only upon the occurrence of abnormal temperatures to bodily move the first portion to a position in which its movements are ineffective to provide the control action, said element being attached to the supporting structure by means of one the second portion only, said first portion moving independently of the second portion regardless of the position thereof.

3. A thermostat comprising, in combination, a snap-acting bimetallic element having two bimetallic portions, both portions moving in the same direction upon an increase in temperature, the first portion being normally operative in a predetermined temperature range for effecting a control action and the second portion snapping only upon the occurrence of abnormal temperatures to bodily move the first portion to a position in which its movements are ineffective to provide the control action, said portions having different thermal characteristics from each other so as to snap from one position to another at different temperatures thereof.

4. A thermostat comprising, in combination, a snap-acting bimetallic element having two bimetallic portions, both portions moving in the same direction upon an increase in temperature, the first portion being normally operative in a predetermined temperature range for effecting a control action and the second portion snapping only upon the occurrence of abnormal temperatures to bodily move the first portion to a position in which its movements are ineffective to provide the control action, said portions having different thermal characteristics from each other so as to snap from one position to another at different temperatures thereof, the second of said portions moving in response to temperature changes independent of the first portion.

5. A thermostat comprising, in combination, a snap-acting bimetallic element having two portions, both portions moving in the same direction upon an increase in temperature, the first portion being normally operative in a predetermined temperature range for effecting a control action and the second portion snapping only upon the occurrence of abnormal temperatures to bodily move the first portion to a position in which its movements are ineffective to provide the control action, said portions having different thermal characteristics from each other so as to snap from one position to another at different temperatures thereof, the second of said portions moving in response to temperature changes independently of the first portion.

6. A thermostat comprising, in combination, a supporting structure, cooperating contacts, and a snap-acting bimetallic element, said bimetallic element having two portions of different thermal characteristics, both portions moving in the same direction upon an increase in temperature, one of said portions being attached to the supporting structure to support said element, the second of said portions carrying one of said contacts, said second portion moving with a snap-acting action independently of the first portion to engage and disengage the cooperating contacts in response to changes in temperature thereof, and said first portion moving with a snap action in response to changes in temperature thereof to bodily move the second portion for engaging and disengaging the cooperating contacts.

7. A thermostat comprising, in combination, a supporting structure, cooperating contacts, a snap-acting bimetallic element, said bimetallic element having two portions of different thermal characteristics, both portions moving in the same direction upon an increase in temperature, the first of said portions being attached to the supporting structure to support said element, the second of said portions extending from the free end of said first portion in substantially the same direction that said first portion extends from said supporting structure and carrying one of said contacts, said second portion moving with a snap-acting action independently of the first portion to engage and disengage the cooperating contacts in response to changes in temperature thereof, and said first portion moving with a snap action in response to changes in temperature thereof to bodily move the second portion for engaging and disengaging the cooperating contacts, and means engaging the first portion for manually moving the element to a contact engaged position.

KENNETH L. WOODMAN.